H. J. Shumway.
Cistern.
Patented Nov. 19, 1833.
7838X
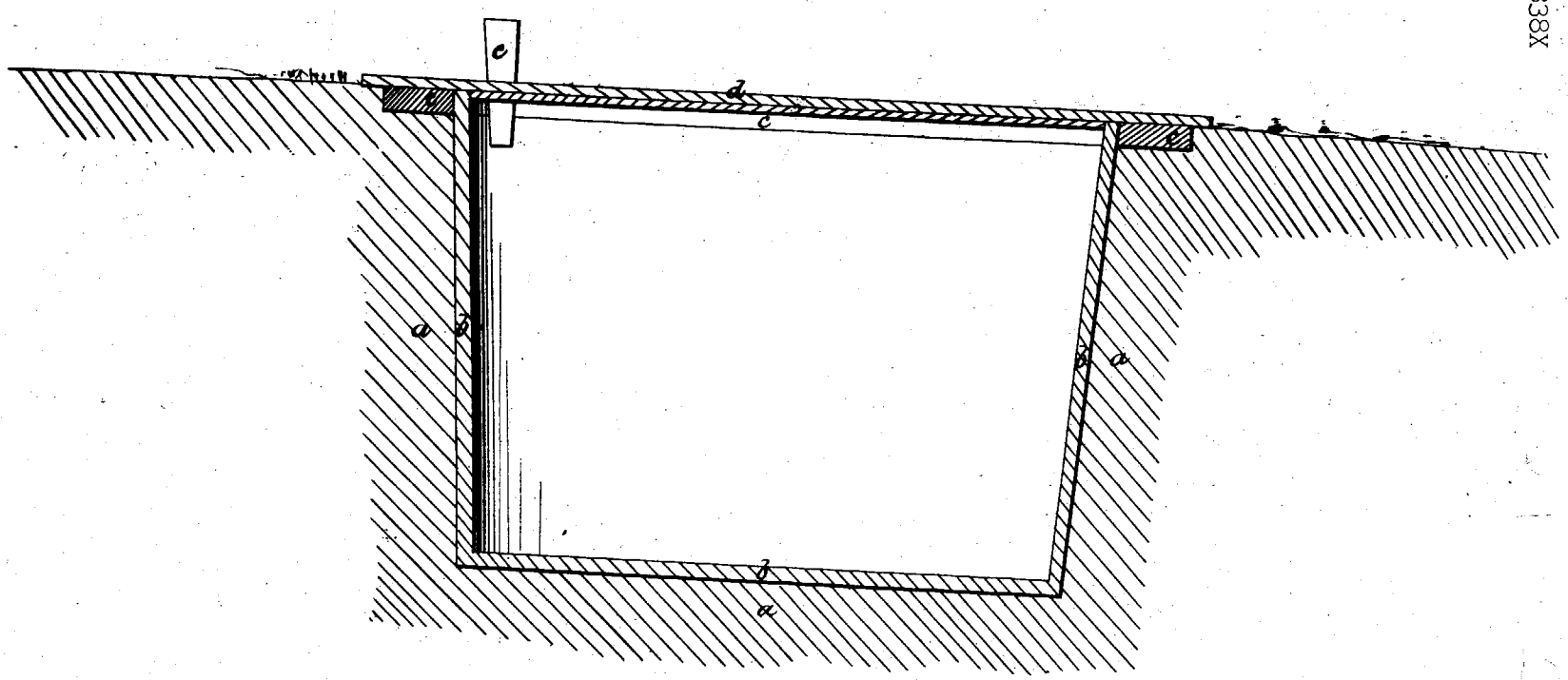

78388X Nov 19. 1833

Horace J. Shumway of Van Buren N. York
Letters Patent

The Schedule referred to in these Letters Patent and making part
of the same containing a description in the words of the said
Horace J. Shumway himself of his improvement in making
Water Cisterns, Cider Vaults, Salt Vats or reservoirs, fish ponds &c.

To all to whom these presents shall come. Be it known that I
Horace J. Shumway of the town of Van Buren in the County of Onon
daga, and State of New York, have invented a new and useful
improvement in making Water Cisterns, Cider Vaults or Cisterns,
Salt Vats or Reservoirs, Fish Ponds, Tanners Vats, and such other
cisterns vats vaults, Reservoirs &c as may be necessary for holding large
quantities of liquids, and that the following is a full and exact de
scription of the operation of building and constructing said cisterns
vats vaults Reservoirs ponds &c above mentioned, as invented or im
proved by me viz. First, for constructing cisterns vats, vaults or
Reservoirs or ponds which may be required to be built below the
surface of the earth, dig or excavate the earth forming a hole
of the required shape and dimensions, then if by reason of springs
stone or other causes, a smooth and even surface of wall and bottom
is not obtained, other earths as sand clay, loam or gravel,
or a mixture of these is to be used to fill the cavities and thus
form a smooth and even surface of bottom and wall,
This done the bottom and wall is to be spread or plastered
over with this mortar formed as aforesaid, viz Water Lime
sand and water mixed together in the proportions now used (or such
other proportions as the nature of the earth, in which the Cistern,
vat vault, Reservoir or Pond is to be built or constructed may
seem to require) to form a cement. If by reason of springs or
other cause, a greater consistency of mortar is required than
can be easily be obtained by the mixture of the water lime, sand and water, gravel may be used, and either mixed in while ma-
king the mortar or sprinkled on to the same after having been plas-
tered or spread on and partially or wholly imbedded while the
mortar is yet green or soft. This done and the first coat hav-
ing obtained a sufficient hardness or consistency to receive a
second, it should be immediately applied and the gravelling re-
peated, and so on until the wall shall have attained the required
thickness. Cisterns Vats, Vaults or Reservoirs, thus formed either
with or without the gravel, and which require to be covered with
either wood or stone are to be so done by first preparing a foun-
dation for the covering to rest upon on the outside of the wall
of cement so that the covering may not rest upon the wall of
cement, then put on the covering, which is to be so nicely fit-
ted to the top of the wall that by plastering upon the underside
of the covering there may be a continuation of the walls all over
the whole exterior of the Cistern Vat, vault, or reservoir.
If the above covering is made of wood a coat of mortar ought
to be spread over the whole outside to prevent decay. In
the cover there may be left a hole or a tube inserted through
which the liquid is to pass into the Cistern vault, vat, &c as above.
and also another hole of any convenient size out of which to draw
the liquid and if large this ought and is to be protected by a
curb and this curb covered with a lid. A drain may also
be necessary, and for this purpose a small aperture or opening
should be left or a tube inserted in such a manner as to prevent
any waste of the cement. To construct or build any of the
above named articles, which shall or may be required to be built
upon or above the surface of the earth a frame or mould will
be necessary, and when made of wood the outside should be protect-
ed from frost and decay by a coat of Plaster, or otherwise, and
the inside may be plastered without (and with the use of grav-
el) with a mortar made as aforesaid. The particular

7838X advantages which this method of constructing or building cisterns
vats, vaults reservoirs and ponds which are to be sunk be-
low the surface of the earth, by plastering upon the bare
walls of earth instead of first lining the hole or excavation
with Stone, brick or wood as is now practised in construc-
ting water cisterns, are numerous, but the principle of which
are cheapness and durability. Wood thus exposed will soon
decay and leave the wall unsupported. Brick by contraction
and expansion cracks the walls. and at the same time like
Stone are expensive. The principal grounds and items
for and upon which your Petitioner prays and requests letters
Patent are the following viz 1st for plastering upon the earth-
y walls instead of plastering upon Stone Brick, and wood. as
heretofore and now practised in building, and constructing of cisterns for
holding rain water which may pass through a rectifying before flow
ing into the cistern by which the water is fit for all uses 2d For
applying the use of said cement. to the constructing and building
of cider cisterns or vaults Tanners Vats. Salt vats or reservoirs,
Fish ponds and other vaults and reservoirs for holding large
quantities of liquids, for which the said cement has not been used
or known. 3d For the use of gravel to stiffen or harden the mor-
tar which has not been heretofore used in the manner specified -
above or in any other, to form a cement, or stiffen the mortar,
In Witness whereof I have hereunto subscribed my
name 8th day of November AD 1833.

Witnesses
Saml. L. Allen
John R Hickox

Horace J Shumway (1056 mm)

(Patented Nov. 19. 1833)

Ex
TH